April 8, 1969     S. JERUSHALMI ET AL     3,437,091
PACEMAKING DEVICE-ELECTRODE CATHETER AND METHOD
Filed Dec. 2, 1966
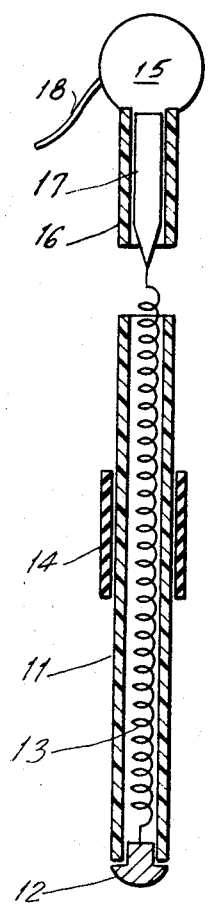
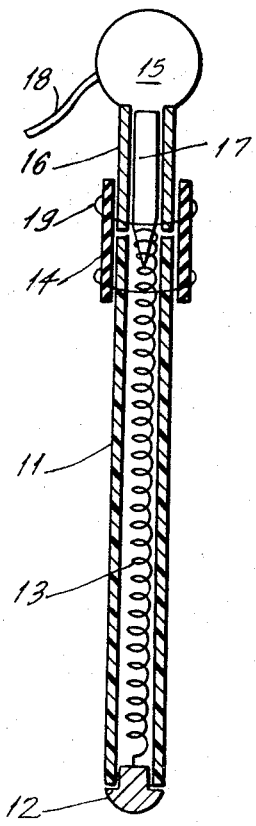
INVENTORS
SHMUEL JERUSHALMI
ITZHAK MICHAEL BARR
BY
OSTROLENK, FABER, GERB & SOFFEN
ATTORNEYS United States Patent Office 3,437,091
Patented Apr. 8, 1969

3,437,091
PACEMAKING DEVICE-ELECTRODE
CATHETER AND METHOD
Shmuel Jerushalmi, Rehovoth, and Itzhak Michael Barr, Haifa, Israel, assignors to Yeda Research and Development Co., Ltd., Rehovoth, Israel
Filed Dec. 2, 1966, Ser. No. 598,854
Claims priority, application Israel, Dec. 19, 1965, 24,829
Int. Cl. A61n 1/36
U.S. Cl. 128—404                    4 Claims It is an object of the present invention to provide a novel combination of a pacemaking device with an electrode catheter of adjustable length and a method for producing such a catheter. It is a further object of the present invention to provide such a combination for use in transvenous pacemaking. Other and further objects of the present invention will become apparent hereinafter.

In transvenous pacemaking it is necessary to implant both the impulse-giving device, which is implanted under the skin, and a catheter which leads from this device to the location where the excitation of the tissue is to be effected. The catheter must have a very definite length, as otherwise it is likely to break during use. Hitherto it was customary to insert a catheter through the jugular vein and to bring its tip up to the desired location of the heart where it was to apply an impulse; to measure the exact length required and to insert afterwards a catheter of given length with pacemaking device attached thereto. This procedure has the drawbacks that a catheter has to be inserted twice, and furthermore a stock of catheters of different length has to be maintained.

According to the present invention there is provided a novel monopolar electrode catheter of adjustable length. Such catheters are provided with a length greater than that required, they are adjusted to the correct size during the procedure of insertion through the jugular vein, and thus the above drawbacks are eliminated.

In the following the present invention will be described with reference to the implantation of a RF-detector pacemaking device, but it is to be clearly understood that this is by way of illustration only and that this type of novel electrode catheter is applicable to any other type of implanted internal pacemaking devices or similar devices for exciting any desired nerve or tissue.

The novel electrode catheter of adjustable length is described in the following by way of example only, with reference to the enclosed drawing, which is not according to scale, in which:

FIGURE 1 is a schematical longitudinal partial cross-section through a catheter according to the invention; and FIGURE 2 is a partial cross-section through such catheter in the assembled state.

The catheter is shown in FIGURE 1 during the stage of assembly, while in FIGURE 2 it is shown in the assembled state. This novel electrode catheter of the monopolar type comprises a tubular member 11, which is advantageously a tube of electrically insulating, physiologically acceptable resilient plastic material, into which there is inserted at one of its ends with tight fit a contact tip 12, made of stainless steel, a platinum-iridium alloy or the like. To the end of the tip inserted into the tubular member 11 there is soldered one end of a platinum-iridium spiral spring 13, which is inserted into the tubular member 11, and which is of an outer diameter slightly smaller than the internal diameter of this tube. Onto the tubular member 11 there is slipped a short length of rubber tube, or the like, 14. This may be of silicone rubber, Tygon tubing or any other similar material. The source of the impulses 15, is of small size. It is advantageously button shaped, coated with epoxy resin and with silicone rubber. This source of impulses, which may be a RF-detector, is provided with an insulating tubular member 16 of an outer diameter equal to that of the tube 11, and one of the output poles is electrically connected with the screw 17, adapted to be connected with the spiral spring 13, while the other pole is connected with the electrically insulated wire 18, which has at its end a bare tip.

For implantation the electrode catheter is threaded through an opening of the jugular vein, and thus the need for thoracotomy is obviated. The catheter is inserted to such a depth that it makes contact with the desired location of the heart, and this can be monitored with fluoroscope. At this stage the free end of the catheter is cut to the necessary length, the spring is pulled out a few millimeters, screw 17 is firmly attached to it, and the spring is left to return due to its elasticity into the tube 11. The screw 17 may be attached to the spring 13 by pushing the screw with a twisting motion into the spring which would be held in a fixed position until the screw was fixed therein. Alternatively, the screw may be replaced by a smooth rod, of stainless steel or equivalent material, have the same dimensions as the screw 17, that is, with an outside diameter somewhat larger than the internal diameter of the spring. Thus the rod may be forcefit and frictionally held within the spring as was the case for the embodiment utilizing a screw. Tubular members 11 and 16 touch at their adjacent ends, and the tube 14 is slipped over this place of contact and is fastened tightly by means of surgical thread 19. In actual use a RF-detector of about 2.5 ml. volume was used, and this was affixed to the adjoining tissue and the wound was closed so as to locate the RF-receiver in a pocket just under the skin. This surgical procedure is relatively simple and without danger. As the threshold needs for endocardial pacemaking are small, it is easy to provide the necessary impulses with small simple devices. The RF-receiver type of pacemaking device has many advantages, such as external control of impulse strength and repetition rate, external location of the power supply, ease of discontinuing of the pacing, obviation of danger of electrical leakage. It is clear that other equivalent pacemaking devices can be used instead.

The present invention relates both to the combination of a pacemaking device and an electrode catheter and also to the method of producing an electrode catheter of desired length, as described in detail hereinbefore.

We claim:

1. A pacemaking device and an electrode catheter of the monopolar type for use therewith comprising in combination a tubular member of electrically insulating resilient material of a length exceeding the required length of the catheter, a metal contact tip inserted at one end of the tube and a metal spiral spring attached at the interior of the tube to the metal tip and extending along the entire length of the tube, a tubular member attached to the pacemaking device, made of electrically insulating material, an electrically conducting metal member provided inside this tubular member, connected to the one pole of the output of the pacemaking device, and adapted to be firmly attached to the spiral spring, means being provided for sealing the contact between the two tubular members hermetically.

2. The combination as claimed in claim 1, wherein the electrically conducting member adapted to be connected with the spiral spring is a metal screw.

3. A method of producing an electrode catheter of desired length, which comprises providing the parts claimed in claim 1, establishing the necessary length of the catheter to be implanted, cutting the first tubular member and spring to the necessary length, firmly attaching the spiral spring to the electrically conducting member provided in the second tubular member connected with the pacemaking device, and hermetically sealing the contact zone between the two coaxial tubular members.

4. A method of producing an electrode catheter of desired length, which comprises providing the parts claimed in claim 2, establishing the necessary length of the catheter to be implanted, cutting the first tubular member and spring to the necessary length, firmly attaching the spiral spring to the electrically conducting member provided in the second tubular member connected with the pacemaking device, and hermetically sealing the contact zone between the two coaxial tubular members.

References Cited

UNITED STATES PATENTS 3,348,548   10/1967   Chardack _____ 128—418

OTHER REFERENCES

Frank, German Allowed Application No. 1,067,538, Oct. 22, 1959, 128–419P.

DeSanctis, Journal American Medical Association, vol. 184, No. 7, May 18, 1963, pp. 544–548, 128–419P.

Schwedel et al., Annals, New York Academy of Sciences, vol. 111, Art. 3, June 11, 1964, pp. 972–980, 128–419P.

WILLIAM E. KAMM, *Primary Examiner.*